US012707402B2

(12) United States Patent
Yuan et al.

(10) Patent No.: US 12,707,402 B2
(45) Date of Patent: Aug. 11, 2026

(54) REPORTING PANEL SPECIFIC POWER MANAGEMENT MAXIMUM POWER REDUCTION (P-MPR)

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorportated, San Diego, CA (US)

(*) Notice: Subject to any disclaimer, the term of this patent is extended or adjusted under 35 U.S.C. 154(b) by 569 days.

(21) Appl. No.: 18/254,406

(22) PCT Filed: Jan. 11, 2021

(86) PCT No.: PCT/CN2021/071076
§ 371 (c)(1),
(2) Date: May 25, 2023

(87) PCT Pub. No.: WO2022/147829
PCT Pub. Date: Jul. 14, 2022

(65) Prior Publication Data
US 2024/0007970 A1 Jan. 4, 2024

(51) Int. Cl.
*H04W 52/36* (2009.01)

(52) U.S. Cl.
CPC ....... *H04W 52/365* (2013.01); *H04W 52/367* (2013.01)

(58) Field of Classification Search
CPC ............. H04W 52/365; H04W 52/367; H04W 52/146; H04W 52/42
See application file for complete search history.

(56) References Cited

U.S. PATENT DOCUMENTS

| | | | | |
|---|---|---|---|---|
| 2015/0098424 | A1 | 4/2015 | Li | |
| 2015/0304965 | A1 | 10/2015 | Park et al. | |
| 2016/0283407 | A1 | 9/2016 | Van Rooyen et al. | |
| 2017/0374632 | A1 | 12/2017 | Lee et al. | |
| 2019/0110260 | A1 | 4/2019 | Lee et al. | |
| 2021/0351888 | A1* | 11/2021 | Park | H04W 72/51 |
| 2022/0394631 | A1* | 12/2022 | Yang | H04W 52/241 |
| 2023/0262612 | A1* | 8/2023 | Matsumura | H04W 16/28 455/522 |
| 2024/0022278 | A1* | 1/2024 | Zhou | H04B 7/063 |

OTHER PUBLICATIONS

International Search Report and Written Opinion—PCT/CN2021/071076—ISA/EPO—Sep. 28, 2021.

* cited by examiner

*Primary Examiner* — John J Lee
(74) *Attorney, Agent, or Firm* — Dinsmore & Shohl LLP

(57) ABSTRACT

Certain aspects of the present disclosure provide techniques for systems and methods for generating and transmitting an antenna panel specific report indicating panel specific metrics, such as power management maximum power reduction (P-MPR). For example, a UE may generate a panel-specific power headroom report (PHR) based on at least one P-MPR value specific to an antenna panel of the UE. The UE may then transmit the PHR to a network entity, such as a base station (e.g., an eNB/gNB), which may assist in the network entity in scheduling decisions. The report may indicate a different panel or a different beam for an uplink transmission. The indicated alternative panel or beam may account for a maximum permissible exposure.

31 Claims, 10 Drawing Sheets

One Frame (TDD)
10 ms
300
subframe
RB
slot
D D D D D D D D D D D D X U
subcarrier
OFDM symbol
slot
DMRS Rx
CSI-RS 330
PDCCH
SSS
PSS
PDSCH
PBCH
20 RBs
SS/PBCH Block system bandwidth
RBs
One Frame (TDD)
10 ms
350
subframe
RB
slot
D X U U U U U U U U U U U U
subcarrier
OFDM symbol
slot
SRS
DMRS R
SRS Comb 0
SRS Comb 1

380
PUCCH
PUSCH

REPORTING PANEL SPECIFIC POWER MANAGEMENT MAXIMUM POWER REDUCTION (P-MPR)

CROSS-REFERENCE TO RELATED APPLICATIONS

This application is a national stage application under 35 U.S.C. 371 of PCT/CN2021/071076 filed Jan. 11, 2021, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for reporting antennal panel specific information.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These and other multiple access technologies have been adopted in various telecommunication standards to provide a common protocol that enables different wireless devices to communicate on a municipal, national, regional, and even global level. However, as the demand for mobile broadband access continues to increase, there exists a need for further improvements in these and emerging wireless communications technologies.

SUMMARY

Certain aspects of the subject matter described in this disclosure can be implemented in a method for wireless communication by a cooperative user equipment (UE). The method generally includes generating a panel-specific power headroom report (PHR) based on at least one panel-specific power management maximum power reduction (P-MPR) value specific to an antenna panel of the UE, and transmitting the PHR to a network entity.

Certain aspects of the subject matter described in this disclosure can be implemented in a method for wireless communications by a network entity. The method generally includes receiving, from a user equipment (UE), a panel-specific power headroom report (PHR) generated based on at least one panel-specific power management maximum power reduction (P-MPR) value specific to an antenna panel of the UE and scheduling an uplink transmission from the UE based on the panel-specific PHR.

Other aspects provide: an apparatus operable, configured, or otherwise adapted to perform the aforementioned methods as well as those described elsewhere herein; non-transitory, computer-readable media comprising instructions that, when executed by one or more processors of a processing system, cause the processing system to perform the aforementioned methods as well as those described elsewhere herein; a computer program product embodied on a computer readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

The appended figures depict certain features of the various aspects described herein and are not to be considered limiting of the scope of this disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
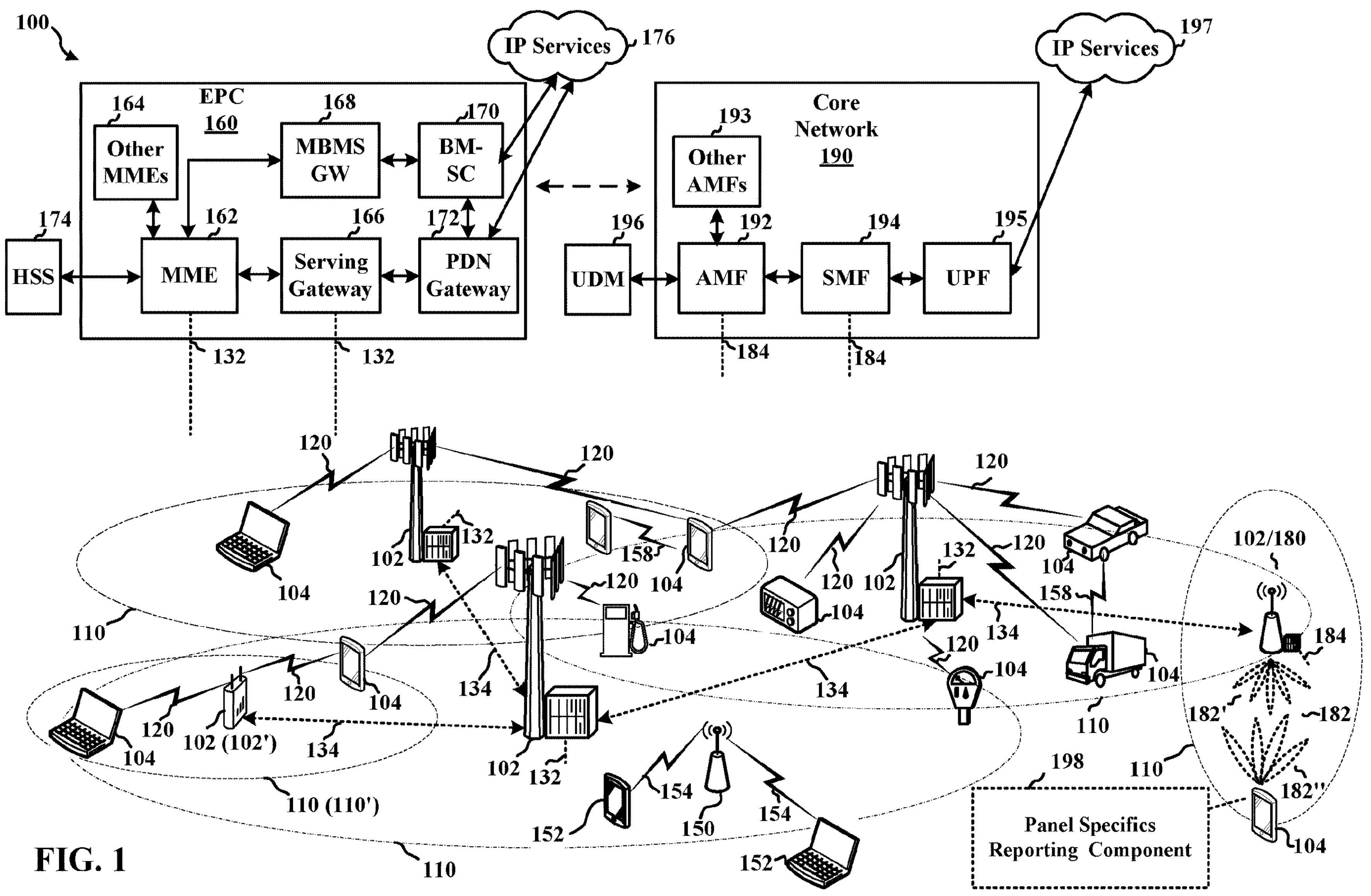
FIG. 1 is a block diagram conceptually illustrating an example wireless communication network, in accordance with certain aspects of the present disclosure.

Aspects of the present disclosure provide systems and methods for generating and transmitting an antenna panel specific report indicating panel specific metrics (as opposed to cell-specific metrics), such as power management maximum power reduction (P-MPR). At a high level, this disclosure provides methods to support panel specific P-MPR and/or uplink (UL) reference signal received power (RSRP) reporting at a user equipment (UE). Virtual power headroom reporting is also supported based on the panel specific P-MPR.

For example, in some cases, a UE within a wireless communication network may generate a panel-specific power headroom report (PHR) based on at least one P-MPR value specific to an antenna panel of the UE. The UE may then transmit the PHR to a network entity, such as a base station (e.g., an eNB/gNB), which may assist in the network entity in scheduling decisions. The report may indicate a different panel or a different beam for an uplink transmission. The indicated alternative panel or beam may account for a maximum permissible emission/exposure (MPE).

The following description provides examples of panel specific P-MPR reporting in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Brief Introduction to Wireless Communication Networks

FIG. 1 depicts an example of a wireless communications system 100, in which aspects described herein may be implemented. While FIG. 1 is briefly introduced here for context, additional aspects of FIG. 1 are described below.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services.

Base stations 102 may generally provide an access point to the EPC 160 and/or core network 190 for a UE 104, and may generally perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions, including those further described herein. Base stations described herein may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may generally provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device (e.g., a smart watch, smart ring, smart bracelet, etc.), a vehicle, an electric meter, a gas pump, a large or small kitchen appliance, a healthcare device, an implant, a sensor/actuator, a display, or any other similar functioning device. Some of UEs 104 may be internet of things (IoT) devices (e.g., parking meter, gas pump, toaster, vehicles, heart monitor, etc.), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 6:
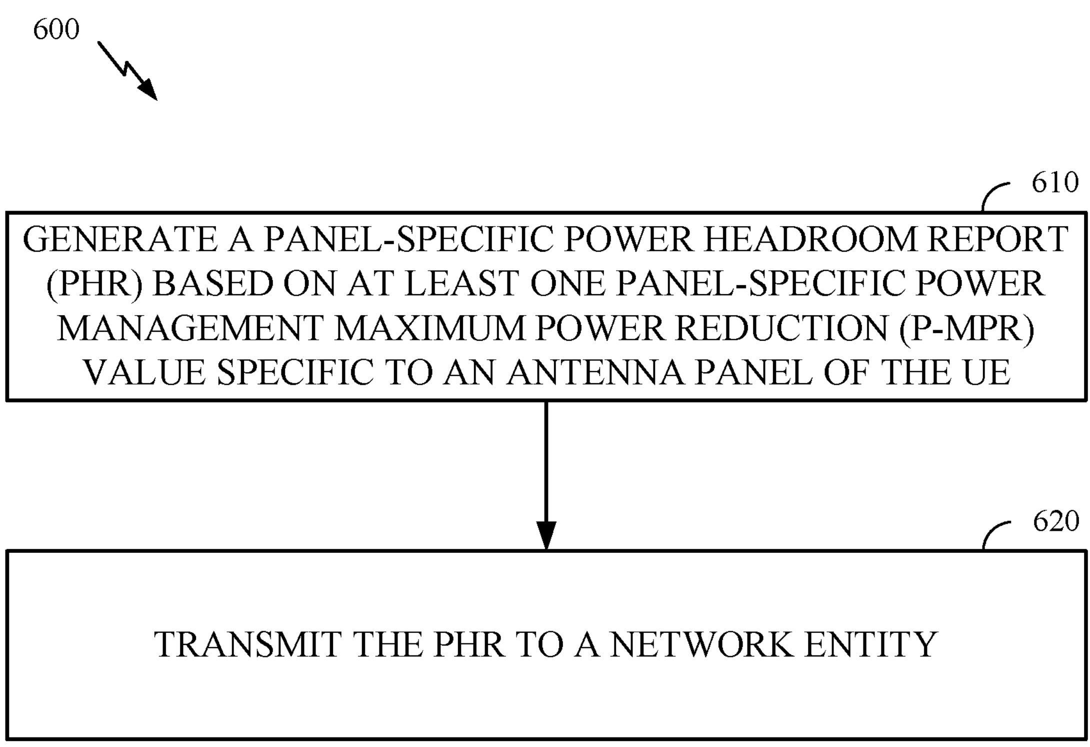
FIG. 6 is a flow diagram illustrating example operations for wireless communication by a UE, in accordance with certain aspects of the present disclosure.

In some cases, a UE 104 in the wireless communication network 100 may include a panel specifics (e.g., P-MPR values specific to respective panel) reporting component 198, which may be configured to perform the operations depicted and described with respect to FIG. 6, as well as other operations described herein for generating a panel-specific power headroom report (PHR) based on at least one panel-specific P-MPR value specific to an antenna panel of the UE. A base station 102 in the wireless communication network 100 may perform operations in concert with panel specific P-MPR reporting by the UE 104.

Figure 2:
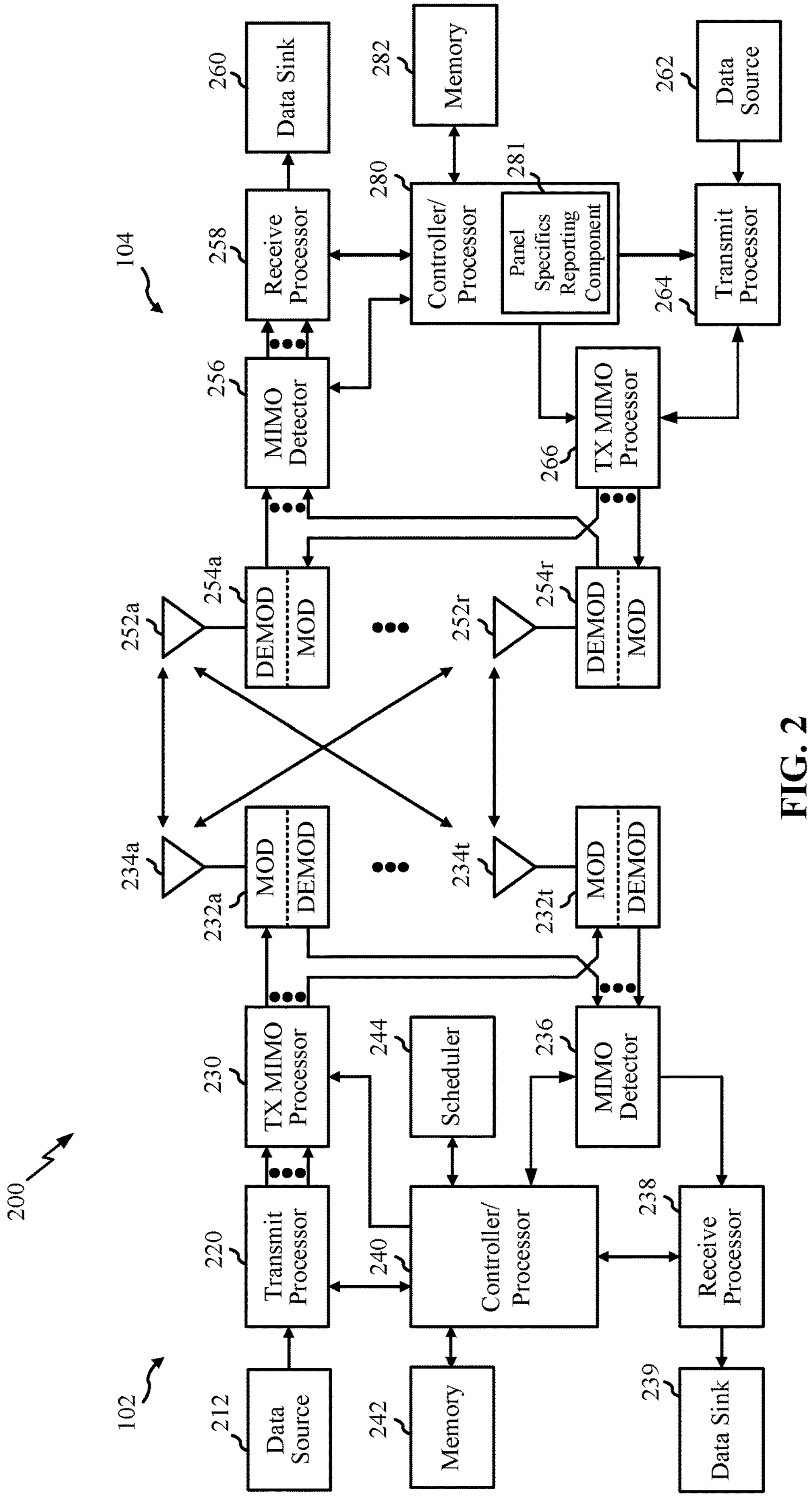
FIG. 2 is a block diagram conceptually illustrating aspects of an example a base station (BS) and user equipment (UE), in accordance with certain aspects of the present disclosure.

FIG. 2 depicts certain example aspects of a base station (BS) 102 and a user equipment (UE) 104. As with FIG. 1, FIG. 2 is briefly introduced here for context and additional aspects of FIG. 2 are described below.

Generally, BS 102 includes various processors (e.g., 220, 230, 238, and 240), antennas 234*a-t*, transceivers 232*a-t*, and other aspects, in order to transmit data (e.g., source data 212) and to receive data (e.g., data sink 239). For example, BS 102 may send and receive data between itself and UE 104.

UE 104 generally includes various processors (e.g., 258, 264, 266, and 280), antennas 252*a-r*, transceivers 254*a-r*, and other aspects, in order to transmit data (e.g., source data 262) and to receive data (e.g., data sink 260).

In the depicted example, UE 104 includes controller/processor 280, which comprises a panel specifics reporting component 281. In some cases, the panel specifics reporting component 281 may be configured to implement the panel specifics reporting component 198 of FIG. 1 and to perform the operations depicted and described with respect to FIG. 6.

Figures 3A, 3B, 3C, 3D:
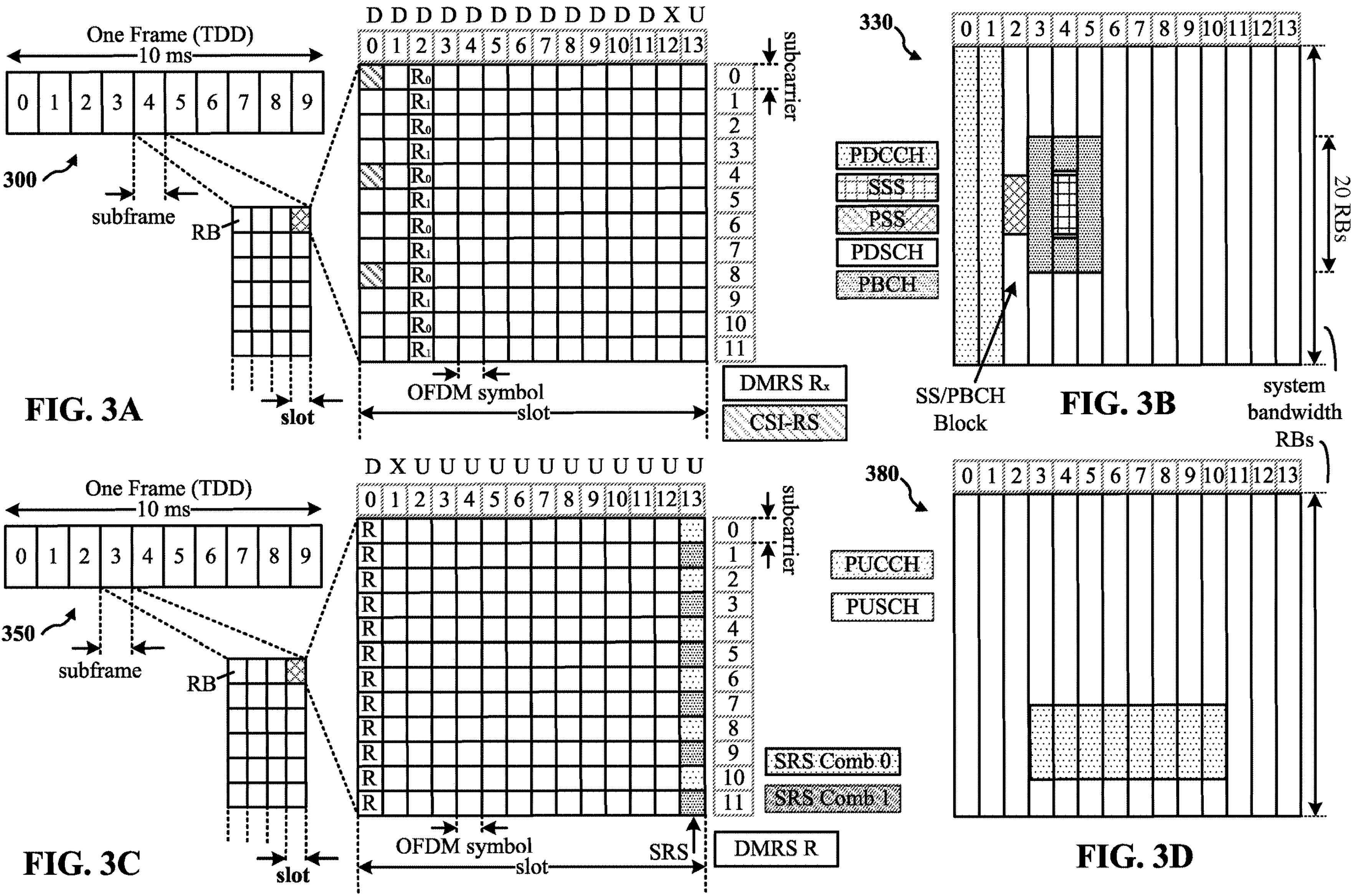
FIGS. 3A-3D depict various example aspects of data structures for a wireless communication network.

FIGS. 3A-3D depict various example aspects of data structures for a wireless communication network, such as wireless communication network 100 of FIG. 1. In particular, FIG. 3A is a diagram 300 illustrating an example of a first subframe within a 5G (e.g., 5G NR) frame structure. FIG. 3B is a diagram 330 illustrating an example of DL channels within a 5G subframe. FIG. 3C is a diagram 350 illustrating an example of a second subframe within a 5G frame structure. FIG. 3D is a diagram 380 illustrating an example of UL channels within a 5G subframe.

Brief Introduction to mmWave Wireless Communications

The electromagnetic spectrum is often subdivided, based on frequency/wavelength, into various classes, bands, channels, etc. In various aspects, a frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmW/near mmW radio frequency band (e.g., 3 GHz-300 GHz) may have higher path loss and a shorter range compared to lower frequency communications. Accordingly, in FIG. 1, mmW base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE

104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Example Uses of Multiple Active Panels and MPE Mitigation

In certain systems, such as the wireless communication network 100 of FIG. 1, a UE may be able to transmit or receive transmissions using multiple antennas, beams, and/or antenna panels (e.g., antenna arrays, antenna groups, or a group of antenna ports). The transmissions may be received from or transmitted to a serving base station (BS) or transmission reception point (TRP) via a Uu interface. Transmission/reception of transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel uplink transmissions.

Figure 4:
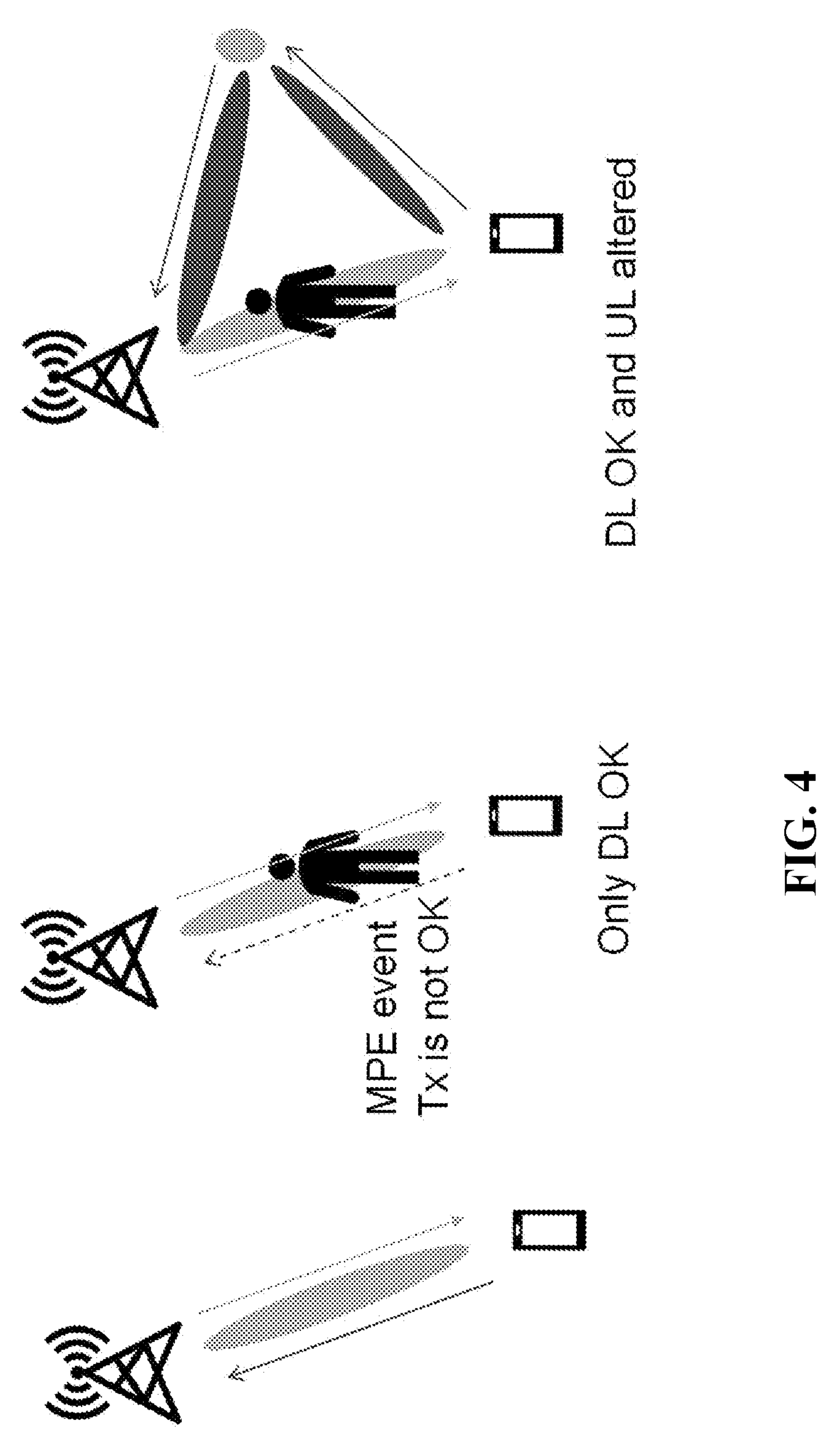
FIG. 4 shows an example of utilizing two or more active antenna panels in a UE, according to aspects of the present disclosure.

FIG. 4 shows an example of utilizing two or more active antenna panels in a UE, according to aspects of the present disclosure. FIG. 4 illustrates three scenarios: a normal use case on the left, a maximum permissible exposure/emission (MPE) event case in the middle, and an altered uplink scenario on the right. As shown, when an MPE event occurs, such as when a subject is becoming too close to an active antenna panel, the UE may seek an alternative uplink that enables efficient transmission and avoiding the MPE event. Therefore, quickly selecting an uplink panel that mitigates MPE is desired. In some cases, selecting an uplink panel may be based on power saving concerns or uplink interference management. In some cases, the UE may support different configurations across panels. In some cases, the UE transmits uplink (UL) transmissions to multiple transmit reception points (TRPs). The present disclosure provides techniques to facilitate fast UL panel selection and MPE mitigation. UL transmission panels may be assumed to be a same set or subset of downlink reception panels.

Figure 5:
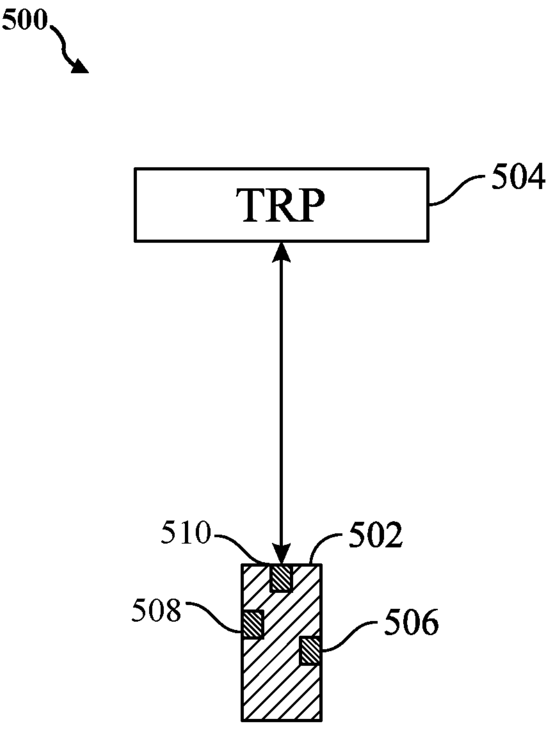
FIG. 5 illustrates a wireless communication system with multiple active panels, according to aspects of the present disclosure.

FIG. 5 illustrates a wireless communication system with multiple active panels, according to aspects of the present disclosure. In some cases, the multiple antenna panels may be localized (e.g., co-located) within a single UE or may be distributed among multiple UEs. For example, FIG. 5 illustrates an example of localized antenna panels within a wireless communications network 500. As illustrated in this example, a Uu interface may be established between a UE 502 (e.g., UE 104) and a transmission reception point (TRP) 504 of a base station/gNB (e.g., BS 110*a*) in the wireless communications network 500. Further, as illustrated, the UE 502 may include a plurality of colocated or localized antenna panels 506, 508, and 510, which may be used by the UE 104 to transmit/receive transmissions to/from the TRP 504 using the Uu interface.

To achieve MPE mitigation, the UE may report P-MPR regarding panel or beam level and a maximum reported number of panels, such that an alternative panel avoiding MPE can be configured for use. For example, if the panel 506 is determined to cause MPE, the UE may report to the network entity for using the panel 508 or 510 that mitigates MPE. The UE may indicate alternative UE panel(s) or transmission (TX) beam(s) for uplink transmission. The UE may alternatively indicate feasible UE panel(s) or TX beam(s) for UL transmission that accounts for the MPE effect. The UE may report SSBRI(s) or CRI(s) to identify the beams associated with the panels. In some cases, the UE may indicate, in the reporting, panel selection details explicitly or implicitly. Additional reporting content may be included. For example, the reporting content may include one or more of P-MPR and L1-RSRP, virtual PHR and L1-RSRP, L1-RSRP, or SINR with and without MPE effect, virtual PHR, P-MPR or virtual PHR+CRI/SSBRI, or an estimated max UL RSRP. The reporting may be initiated or triggered by the UE or configured by the network entity.

Example Determination of Cell Specific Power Management Maximum Power Reduction (P-MPR)

This disclosure provides techniques for supporting antennal panel specific P-MPR reporting, contrasting cell specific power determination that assumes P-MPR being zero. Conventionally, the configured UE maximum output power PCMAX,$_{f,c}$ for carrier f of a serving cell c is set such that the corresponding measured peak EIRP PUMAX,$_{f,c}$ is within the following bounds:

$$
\begin{aligned}
&P_{Powerclass} - \\
&\quad \mathrm{MAX}(\mathrm{MAX}(MPR_{f,c}, A-MPR_{f,c},) + \Delta MBP_{,n}, P-MPR_{f,c}) - \\
&\quad \mathrm{MAX}\{T(\mathrm{MAX}(MPR_{f,c}, A-MPR_{f,c},)), T(P-MPR_{f,c})\} \leq \\
&\qquad PU\mathrm{MAX}_{,f,c} \leq EIRP\mathrm{max}
\end{aligned}
$$

In particular, P-MPR$_{f,c}$ (Power Management UE Maximum Power Reduction) is the allowed maximum output power reduction. The UE applies P-MPR$_{f,c}$ for carrier f of serving cell c only for certain cases, as described below. For UE conformance testing P-MPR$_{f,c}$ shall be 0 dB.

The determination of P-MPR$_{f,c}$ may ensure compliance with applicable electromagnetic power density exposure requirements and addressing unwanted emissions requirements in case of simultaneous transmissions on multiple RAT(s) for scenarios not in the scope of 3GPP RAN specifications. In addition, the determination of P-MPR$_{f,c}$ may ensure compliance with applicable electromagnetic power density exposure requirements in case of proximity detection is used to address such requirements that require a lower maximum output power. However, as further explained, cell specific power determination assumes P-MPR=0 and does not account for panel specific situations.

In the above determination, P-MPR$_{f,c}$ was introduced in the PCMAX,$_{f,c}$ equation such that the UE can report to the gNB the available maximum output transmit power. This information can be used by the gNB for scheduling decisions. Furthermore, P-MPR$_{f,c}$ and maxUplinkDutyCycle-FR2 may impact the maximum uplink performance for the selected UL transmission path.

In view of the above, for the cell specific P-MPR, P-MPR=0 is assumed in the determination process. For example, if the UE determines that a Type 1 PHR for an activated serving cell is based on a reference PUSCH transmission then, for PUSCH transmission occasion i on active UL BWP b of carrier f of serving cell c, the UE computes the Type 1 PHR as $$PH_{type1b,f,c}(i, j, q_d, l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i, l)\} \text{ [dB]}$$

In particular, $\tilde{P}_{CMAX,f,c}$ is computed assuming MPR=0 dB, A-MPR=0 dB, P-MPR=0 dB, and $\Delta T_C$=0 dB. The remaining parameters are calculated based on these assumptions and are defined in published standards, such as Subclause 7.7.1 of TS 38.213. The uplink RSRP can be defined as $$UL\ RSRP = \tilde{P}_{cmax,f,c}(i) - PL_{b,f,c}(q_d) \text{ or } \tilde{P}_{cmax,f,c}(i) - \alpha_{b,f,c}(i) PL_{b,f,c}(q_d)$$

which provides an estimated uplink RSPR at the UE based on the maximum transmit power and measured downlink path loss.

If the UE determines that a Type 3 PHR for an activated serving cell is based on a reference SRS transmission, then, for SRS transmission occasion i on UL BWP b of carrier f of serving cell c, the UE computes the Type 3 PHR as $$PH_{type3b,f,c}(i, q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i)\} \text{ [dB]}$$

In particular, $q_s$ is an SRS resource set corresponding to SRS-ResourceSetId=0 for UL BWP b. $\tilde{P}_{CMAX,f,c}$(i) is again computed by assuming MPR=0 dB, A-MPR=0 dB, P-MPR=0 dB, and $\Delta T_C$=0 dB. Other terms of the equation are defined in Subclause 7.3.1 of TS 38.213.

Example Panel Specific Power Management Maximum Power Reduction (P-MPR) Reporting Therefore, the cell specific power determination may not be suitable in solving MPE issues. This disclosure provides techniques for panel specific P-MPR (e.g., no longer assuming its value being zero when determining power values, or assuming its value is common to all uplink transmissions in a serving cell). As further described below, the calculation and report of PHR may be based on panel ID and panel specific P-MPR values (e.g., no longer assuming its value is common to all uplink transmissions in a serving cell).

FIG. 6 is a flow diagram illustrating example operations 600 for wireless communication, in accordance with certain aspects of the present disclosure. The operations 600 may be performed, for example, by a UE (e.g., such as the UE 502, which may be examples of the UE 104 in the wireless communication network 100/200) for panel status reporting. The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252*a*-252*r* of FIG. 2). In certain aspects, the transmission and/or reception of signals by the UE may be implemented via a bus interface of one or more processors (e.g., controller/processor 280) obtaining and/or outputting signals.

The operations 600 begin, at block 610, by generating a panel-specific power headroom report (PHR) based on at least one panel-specific power management maximum power reduction (P-MPR) value specific to an antenna panel of the UE.

At block 620, the UE transmits the PHR to a network entity.

Figure 7:
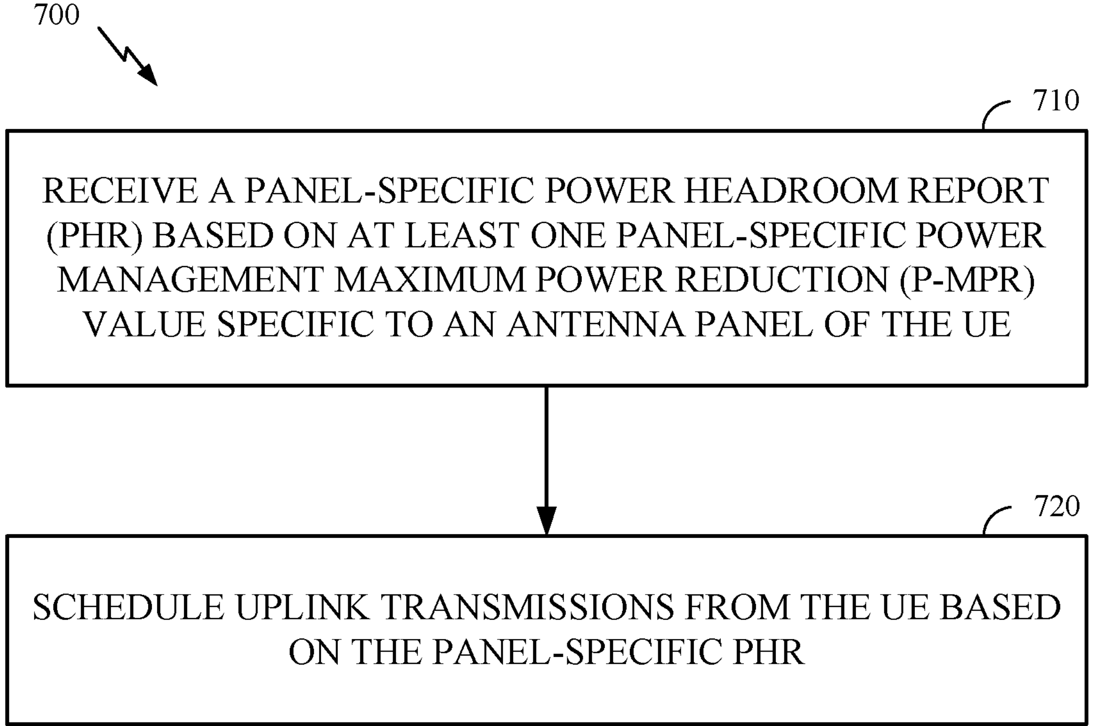
FIG. 7 is a flow diagram illustrating example operations for wireless communication by a network entity, in accordance with certain aspects of the present disclosure.

FIG. 7 is a flow diagram illustrating example operations 700 that may be considered complementary to operations 600 of FIG. 6. For example, operations 700 may be performed by a network entity (e.g., such as the BS 102 of FIG. 1) to process panel-specific PHR reporting from a UE (performing operations 600 of FIG. 7). The operations 700 may be implemented as software components that are executed and run on one or more processors (e.g., controller/processor 240 of FIG. 2). Further, the transmission and reception of signals by the UE in operations 700 may be enabled, for example, by one or more antennas (e.g., antennas 232*a*-232*r* of FIG. 2). In certain aspects, the transmission and/or reception of signals by the UE may be implemented via a bus interface of one or more processors (e.g., controller/processor 240) obtaining and/or outputting signals.

The operations 700 begin, at block 710, by receiving from a UE a panel-specific power headroom report (PHR) generated based on at least one panel-specific power management maximum power reduction (P-MPR) value specific to an antenna panel of the UE.

At block 720, the network entity schedules an uplink transmission for the UE based on the panel-specific PHR. For example, if the P-MPR value for a panel is large, the network entity may schedule a panel of smaller P-MPR for further uplink transmission.

Figure 8:
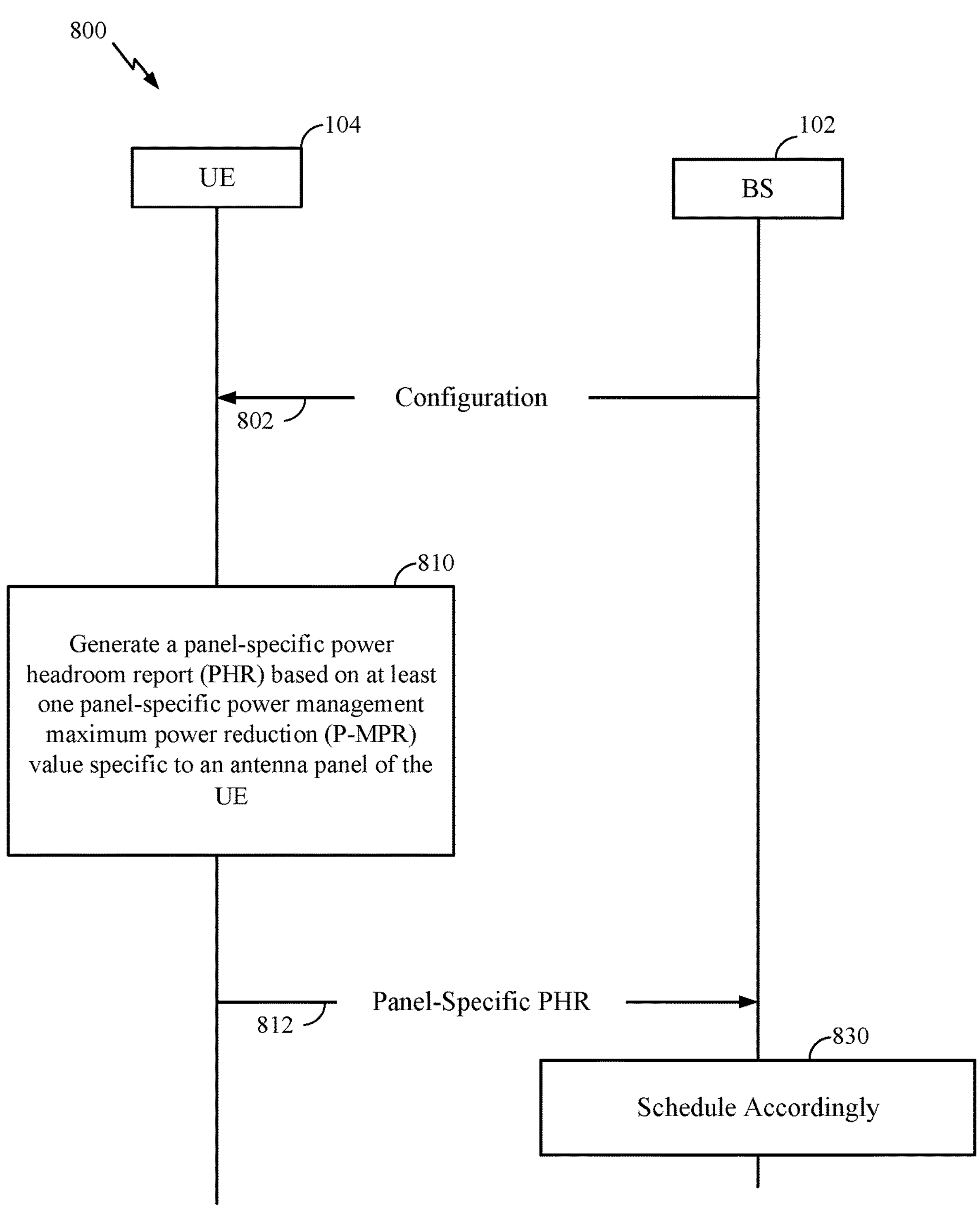
FIG. 8 illustrates an example call flow of interactions between a UE and a BS, in accordance to aspects of the present disclosure.

Operations 600 and 700 of FIGS. 6 and 7 may be understood with reference to the example call flow diagram 800 of FIG. 8, which shows interactions between a UE (the UE 104) and a BS (the BS 102) for panel-specific PHR reporting, in accordance to aspects of the present disclosure.

As shown, the UE 104 may be configured by the BS 102 according to the configuration 702. During operation, at 710, the UE 104 generates a panel-specific power headroom report (PHR) based on at least one panel-specific power management maximum power reduction (P-MPR) value specific to an antenna panel of the UE. At 720, the UE 104 transmits the panel-specific PHR to the BS 102. At 730, the BS 102 schedules accordingly. For example, BS 102 may adjust transmission power, based on the panel-specific PHR or may schedule an uplink transmission for a different panel or a different beam indicated by the panel-specific PHR.

In aspects, the PHR is transmitted to indicate a different panel or a different beam for an uplink transmission. The alternative panel or beam accounts for a maximum permissible exposure (MPE).

In aspects, the PHR is transmitted via a medium access control (MAC) control element (CE) or uplink control information (UCI).

In aspects, generating the PHR based on the panel-specific P-MPR includes calculating a panel-specific maximum allowed UE output power ($P_{CMAX}$) based on the panel-specific P-MPR. In a first example, the panel-specific $P_{CMAX}$ is calculated for a virtual uplink transmission. The virtual uplink transmission comprises a virtual physical uplink shared channel (PUSCH) or virtual sounding reference signal (SRS) transmission. That is, in a panel-specific virtual PHR, the UE may calculate a panel-specific maximum allowed UE output power ($P_{CMAX}$) $\tilde{P}_{cmax,f,c}$, (i, qs) for a virtual transmission or a reference format of PUSCH or SRS with the panel ID based on an actual panel-specific P-MPR for the panel, such as P-MPR=P-MPR(qs). P-MPR (qs) is likely greater than zero, and related to the panel ID (e.g., associated with an ID of qs) or otherwise associated with a specific panel. Other assumptions may remain unchanged: MPR=0 dB, and A-MPR=0 dB.

In a second example, the panel-specific maximum allowed UE output power $P_{CMAX}$ is calculated for an uplink transmission. The real uplink transmission comprises a real physical uplink shared channel (PUSCH) or real sounding reference signal (SRS) transmission. That is, in a panel-specific real PHR report, the UE can calculate a panel-specific $\tilde{P}_{cmax,f,c,}$ (i, qs) for a real transmission of PUSCH or SRS with the panel ID based on actual panel-specific P-MPR for the panel and indicated transmission parameter for the real transmission of PUSCH or SRS.

In a third example, the UE may calculate a panel-specific maximum allowed UE output power $\tilde{P}_{cmax,f,c,}$ (i, qs) for a virtual transmission and the panel-specific PHR is generated based on the panel-specific P-MPR and at least one panel-specific configuration for the panel. The panel-specific configuration specifies at least one of: a default associated pathloss reference signal (RS) in downlink, a default uplink power control adjustment state, or one or more default power control loop parameters. That is, in a panel-specific virtual PHR based on a virtual transmission of PUSCH or SRS for a panel, UE may calculate the panel-specific virtual PHR based on the panel-specific P-MPR and panel-specific configurations with the panel according to:

$$PH_{qs} = \tilde{P}_{cmax,f,c}(i, qs) - \{P_{O_{UL},b,f,c}(qs) + \alpha_{UL,b,f,c}(qs) * PL_{b,f,c}(qd) + h_{UL,b,f,c}(i, l)\}$$

where qs represents a panel identifier (ID). Virtual PHR configuration includes a panel-specific pathloss RS, a power control loop index, p0, and alpha. qd represents a default associated pathloss reference signal (RS) in downlink. $h_{UL,b,f,c}$(i,l) represents a default UL power control adjustment state. l represents a default power control loop. $P_{o_{UL},b,f,c}$(qs) and $\alpha_{UL,b,f,c}$(qs) respectively represent default p0 and alpha. For example, in a virtual PHR report for the first panel, the default power control close loop index may have a value of 0, and in a virtual PHR report for the second panel, the default power control close loop index may have a value of 1. In some aspects, the virtual PHR configuration may be based on a configuration of a predetermined uplink transmission associated with the panel. For example, a default SRS resource set ID may be associated with a panel. In a virtual PHR for the SRS associated with a panel, the virtual PHR configuration may be based on the configurations of the SRS resource set. For example, the first panel may be associated with a SRS resource set ID=0, and the second panel may be associated with a SRS resource set ID=1, where each set of SRS have a configuration of panel-specific pathloss RS, a power control loop, p0, and alpha. In this case, in a virtual PHR report for SRS associated with the first panel, the UE may apply the configuration associated with the SRS resource set ID=0, and in a virtual PHR report for SRS associated with the second panel, the UE may apply the configuration associated with the SRS resource set ID=1.

Furthermore, a virtual PHR configuration may have two or more options. In a first option, the virtual PHR configuration has only one set of values (such as uplink panel, uplink resource or reference signal, panel-specific pathloss RS, a power control loop, p0, and alpha and) for the UE to calculate and report the PHR. In a second option, the at least one panel-specific configuration includes multiple configurations where each configuration has a set of values. The UE may indicate, in the PHR, which of the multiple configurations was used for generating the panel-specific PHR.

In a fourth example, the UE indicates a panel ID for which the panel specific PHR was generated. The panel ID may be explicitly indicated, via a sounding reference signal (SRS) resource set ID, a channel state information reference signal (CSI-RS) resource ID, a power control closed loop index, a control resource set (CORESET) pool index, the beam group ID, or the TCI state list ID. That is, the UE may report panel-specific PHR (i.e., either virtual or real), panel-specific $P_{CMAX}$, panel-specific P-MPR, or panel-specific UL RSRP per panel (instead of per cell).

In some cases, the panel ID may be indicated as an explicit panel ID, such as employing a two-bit panel ID if the UE has four panels. In other cases, the panel ID may be indicated as an SRS resource set ID, such as an SRS set for NCB or CB. The panel ID may be indicated as a CSI-RS resource ID, such as a CSI-RS resource associated with an SRS set for NCB. The panel ID may be a power close loop index, such as 0 or 1. The panel ID may be indicated as a CORESET pool index, such as 0 or 1.

In a fifth example, the PHR includes a dedicated bit for identifying a panel identifier (ID) specific to the panel. In some cases, content reported for different panels is positioned in the report in a defined order, such that no separate/dedicated bit for panel ID would be needed. In some cases, if an actual panel-specific PHR is reported, a panel-specific maximum allowed UE output power ($P_{CMAX}$) is also reported. In some cases, the PHR includes at least one of the panel-specific P-MPR or an uplink reference signal received power (RSRP).

In aspects, the UE indicates in the PHR at least one of a candidate panel or a beam reference signal (RS) identifier (ID). The candidate panel or beam RS ID is indicated in the report when a reporting criteria to the candidate panel or beam RS ID are met.

In aspects, the UE selects the candidate panel or beam RS ID based on one or more criteria. For example, the criteria may include that at least one of a P-MPR or PHR value exceeds a threshold value. For example, when the reporting condition is to enable UE to report a failed panel or beam RS ID, the criteria may be a panel-specific P-MPR exceeding a threshold value (e.g., when the P-MPR value is large) or an associated power headroom value (PHR value) is less than a threshold value. For example, when the reporting condition is to enable UE to report an alternative or feasible panel or beam RS ID, the criteria can be a panel-specific P-MPR smaller than a threshold value (e.g., when the P-MPR value is small) or an associated power headroom value (PHR value) is greater than a threshold value.

In aspects, the candidate panels or beam RS IDs (including the number thereof) are configured by radio resource control (RRC) signaling or reported by the UE.

Figure 9:
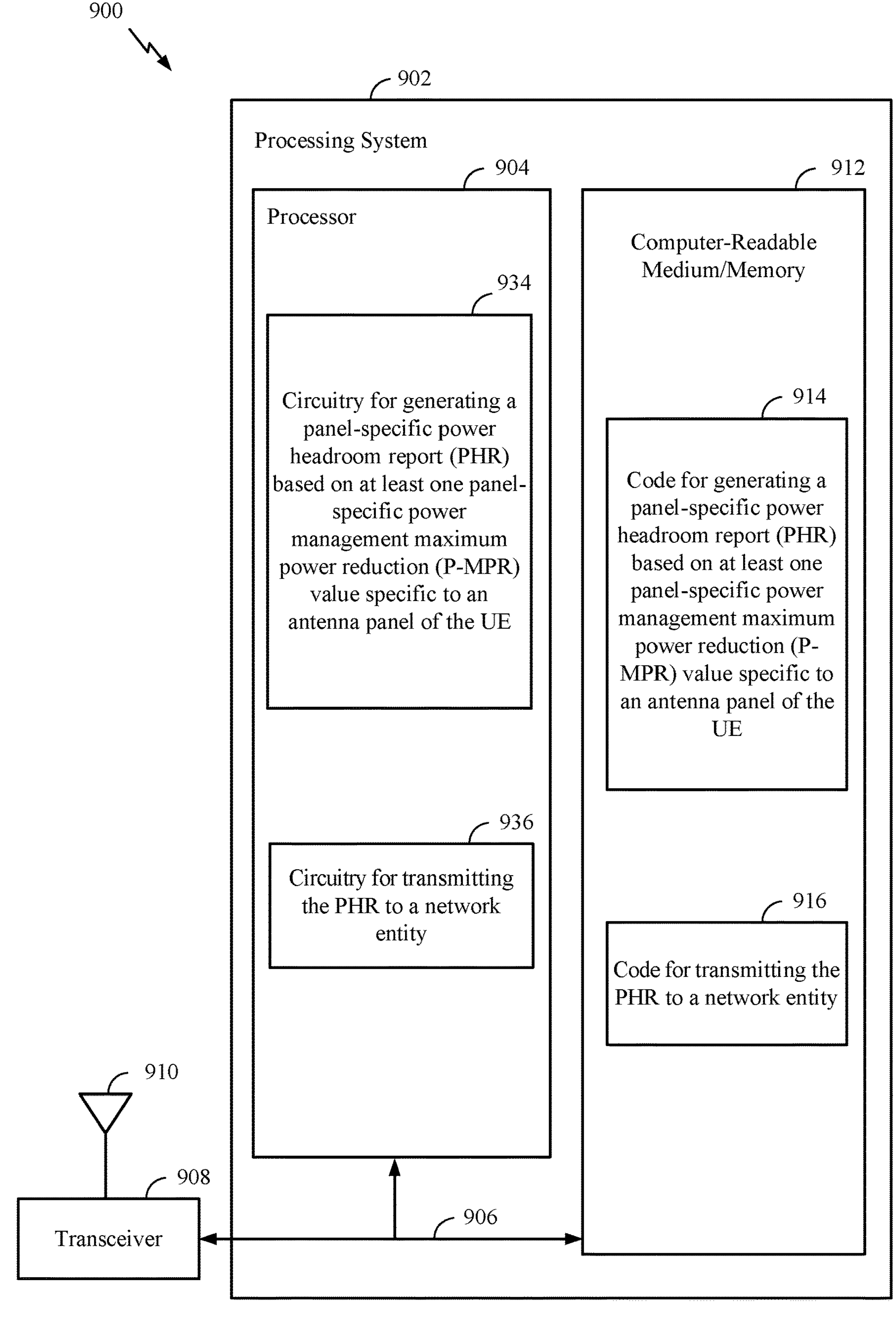
FIG. 9 illustrates a communications device, or part thereof, which may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 6. For example, in some cases, the communications device 900 may be an example of a UE (e.g., UE 502, UE 104). The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900. In some cases, the transceiver 908 may include one or more components of UE 104 with reference to FIG. 2 such as, for example, transceiver 254, MIMO detector 256, receive processor 258, TX MIMO processor 266, transmit processor 264, and/or the like.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 6, or other operations for performing the various techniques discussed herein for panel status reporting. In certain aspects, computer-readable medium/memory 912 stores code 914 for generating a panel-specific power headroom report (PHR) based on at least one panel-specific power management maximum power reduction (P-MPR) value specific to an antenna panel of the UE, and code 916 for transmitting the PHR to a network entity. The processor 904 includes circuitry 934 for generating a panel-specific PHR based on at least one panel-specific P-MPR value specific to an antenna panel of the UE and circuitry 936 for transmitting the PHR to a network entity.

Figure 10:
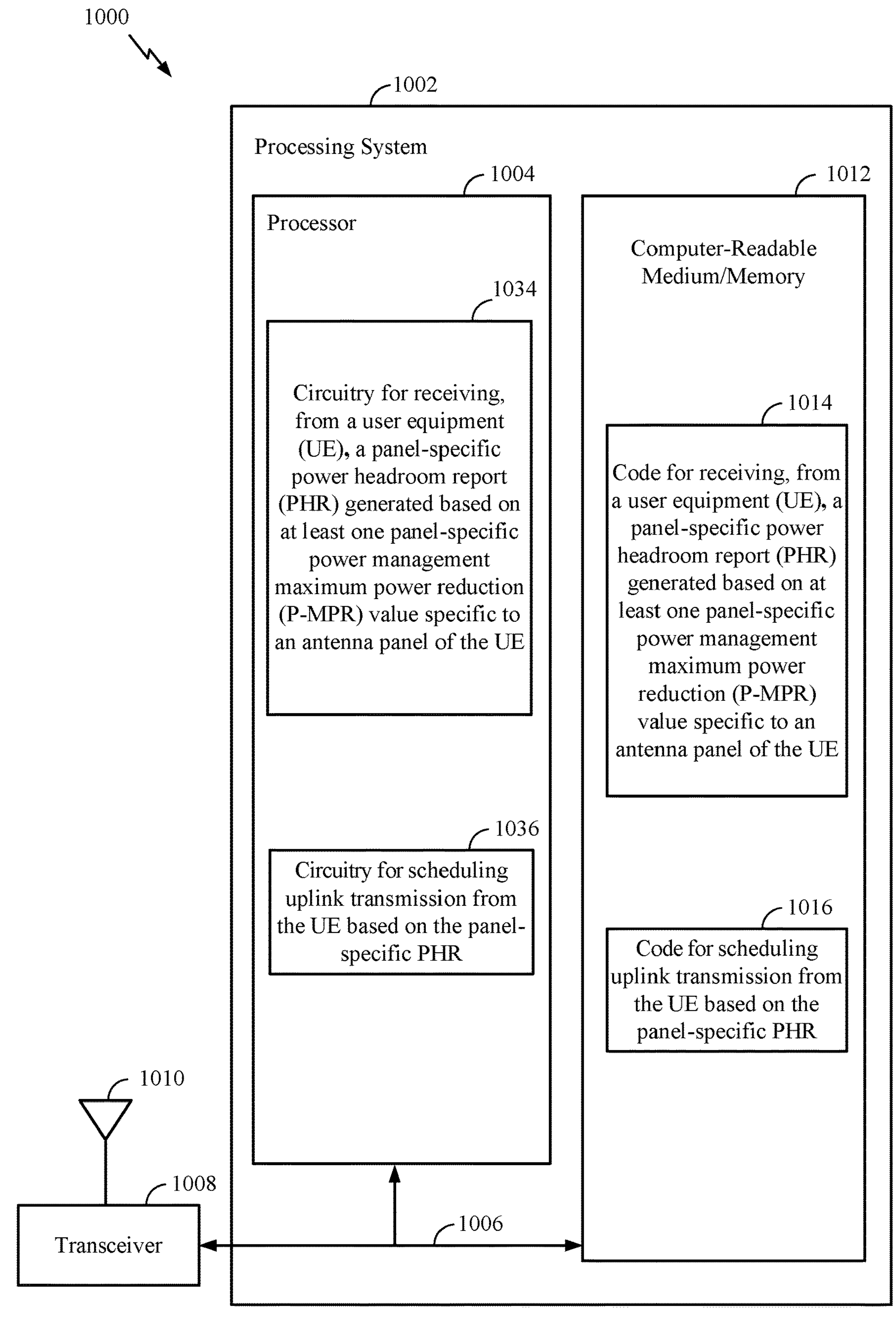
FIG. 10 illustrates a communications device, or part thereof, which may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. For example, in some cases, the communications device 1000 may be an example of a network entity (e.g., TRP 504, BS 102). The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000. In some cases, the transceiver 1008 may include one or more components of UE 104 with reference to FIG. 2 such as, for example, transceiver 232, MIMO detector 236, receive processor 238, TX MIMO processor 230, transmit processor 220, and/or the like.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein for panel status reporting. In certain aspects, computer-readable medium/memory 1012 stores code 1014 for receiving, from a user equipment (UE), a panel-specific power headroom report (PHR) generated based on at least one panel-specific power management maximum power reduction (P-MPR) value specific to an antenna panel of the UE, and code 1016 for scheduling an uplink transmission from the UE based on the panel-specific PHR. The processor 1004 includes circuitry 1034 for receiving, from a user equipment (UE), a panel-specific power headroom report (PHR) generated based on at least one panel-specific power management maximum power reduction (P-MPR) value specific to an antenna panel of the UE and circuitry 1036 for scheduling an uplink transmission from the UE based on the panel-specific PHR.

EXAMPLE ASPECTS

Implementation examples are described in the following numbered clauses:

Clause 1: A method for wireless communications by a user equipment (UE), comprising: generating a panel-specific power headroom report (PHR) based on at least one panel-specific power management maximum power reduction (P-MPR) value specific to an antenna panel of the UE; and transmitting the PHR to a network entity.

Clause 2: The method of Clause 1, wherein the PHR is transmitted to indicate an alternative panel or beam for an uplink transmission.

Clause 3: The method of Clause 1 or 2, wherein the indicated alternative panel or beam accounts for a maximum permissible exposure (MPE).

Clause 4: The method of any one of Clauses 1-3, wherein the PHR is transmitted via a medium access control (MAC) control element (CE) or uplink control information (UCI).

Clause 5: The method of any one of Clauses 1-4, wherein generating the PHR based on the panel-specific P-MPR comprises calculating a panel-specific maximum allowed UE output power ($P_{CMAX}$) based on the panel-specific P-MPR.

Clause 6: The method of any one of Clauses 1-5, wherein the panel-specific $P_{CMAX}$ is calculated for an real uplink transmission.

Clause 7: The method of any one of Clauses 1-6, wherein the real uplink transmission comprises a real physical uplink shared channel (PUSCH) or real sounding reference signal (SRS) transmission.

Clause 8: The method of Clause 5, wherein the panel-specific $P_{CMAX}$ is calculated for a virtual uplink transmission.

Clause 9: The method of Clause 8, wherein the virtual uplink transmission comprises a virtual physical uplink shared channel (PUSCH) or virtual sounding reference signal (SRS) transmission.

Clause 10: The method of Clause 8, wherein the panel-specific PHR is generated based on the panel-specific P-MPR and at least one panel-specific configuration for the panel.

Clause 11: The method of Clause 10, wherein the panel-specific configuration specifies at least one of: a default associated pathloss reference signal (RS) in downlink, a default uplink power control adjustment state, or one or more default power control loop parameters.

Clause 12: The method of Clause 10, wherein the virtual PHR configuration has a default set of values.

Clause 13: The method of Clause 10, wherein: the at least one panel-specific configuration comprises multiple configurations; and the UE indicates, in the PHR, which of the multiple configurations was used for generating the panel-specific PHR.

Clause 14: The method of Clause 1, wherein the UE indicates a panel ID for which the panel specific PHR was generated.

Clause 15: The method of Clause 14, wherein the panel ID is indicated explicitly, via a sounding reference signal (SRS) resource set ID, via a channel state information reference signal (CSI-RS) resource ID, a power control closed loop index, or a control resource set (CORESET) pool index.

Clause 16: The method of Clause 1, wherein the PHR includes a dedicated bit for identifying a panel identifier (ID) specific to the panel.

Clause 17: The method of Clause 1, wherein content reported for different panels is positioned in the PHR in a defined order.

Clause 18: The method of Clause 1, wherein, if an actual panel-specific PHR is reported, a panel-specific maximum allowed UE output power ($P_{CMAX}$) is also reported.

Clause 19: The method of Clause 1, wherein the PHR includes at least one of the panel-specific P-MPR or an uplink reference signal received power (RSRP).

Clause 20: The method of Clause 1, further comprising, indicating, in the PHR, at least one of a candidate panel or a beam reference signal (RS) identifier (ID).

Clause 21: The method of Clause 20, wherein the candidate panel or beam RS ID is indicated in the PHR when a panel-specific P-MPR exceeds a threshold value or an associated power head room (PHR value) satisfies a threshold value.

Clause 22: The method of Clause 20, further comprising selecting the candidate panel or beam RS ID based on one or more criteria.

Clause 23: The method of Clause 22, wherein the criteria comprises at least one of a P-MPR or PHR value exceeds a threshold value.

Clause 24: The method of Clause 20, wherein candidate panels or beam RS IDs are configured by radio resource control (RRC) signaling or reported by the UE.

Clause 25: A method for wireless communications by a network entity, comprising: receiving, from a user equipment (UE), a panel-specific power headroom report (PHR) generated based on at least one panel-specific power management maximum power reduction (P-MPR) value specific to an antenna panel of the UE; and scheduling an uplink transmission from the UE based on the panel-specific PHR.

Clause 26: The method of Clause 25, wherein: the PHR indicates a different panel or a different beam for an uplink transmission; and the scheduling involves the alternative panel or beam.

Clause 27: The method of Clause 25 or 26, wherein the indicated alternative panel or beam accounts for a maximum permissible exposure (MPE).

Clause 28: The method of any one of Clauses 25-27, wherein the PHR is received via a medium access control (MAC) control element (CE) or uplink control information (UCI).

Clause 29: The method of any one of Clauses 25-28, further comprising signaling the UE at least one panel-specific configuration, wherein the panel-specific PHR is generated based on the panel-specific P-MPR and the at least one panel-specific PHR configuration for the panel.

Clause 30: The method of any one of Clauses 25-29, wherein the panel-specific configuration specifies at least one of: a default associated pathloss reference signal (RS) in downlink, a default uplink power control adjustment state, or one or more default power control loop parameters.

Clause 31: The method of any one of Clauses 25-30, wherein the panel-specific PHR configuration has a default set of values.

Clause 32: The method of any one of Clauses 25-31, wherein: the at least one panel-specific configuration comprises multiple configurations; and the UE indicates, in the PHR, which of the multiple configurations was used for generating the panel-specific PHR.

Clause 33: The method of any one of Clauses 25-32, wherein the UE indicates a panel ID for which the panel specific PHR was generated.

Clause 34: The method of Clause 33, wherein the panel ID is explicitly indicated, via a sounding reference signal (SRS) resource set ID, a channel state information reference signal (CSI-RS) resource ID, a power control closed loop index, or a control resource set (CORESET) pool index.

Clause 35: The method of Clause 25, wherein the PHR includes a dedicated bit for identifying a panel identifier (ID) specific to the panel.

Clause 36: The method of Clause 25, wherein content reported for different panels is positioned in the PHR in a defined order.

Clause 37: The method of Clause 25, wherein, if an actual panel-specific PHR is reported, a panel-specific maximum allowed UE output power ($P_{CMAX}$) is also reported.

Clause 38: The method of Clause 25, wherein the PHR includes at least one of the panel-specific P-MPR or an uplink reference signal received power (RSRP).

Clause 39: The method of Clause 25, further comprising, indicating, in the PHR, at least one of a candidate panel or a beam reference signal (RS) identifier (ID).

Clause 40: The method of Clause 39, wherein the candidate panel or beam RS ID is indicated in the PHR when a panel-specific P-MPR exceeds a threshold value or an associated power head room (PHR value) satisfies a threshold value.

Clause 41: The method of Clause 39, wherein candidate panels or beam RS IDs are configured by the network entity via radio resource control (RRC) signaling or reported by the UE.

Clause 42: An apparatus for wireless communications by a user equipment (UE), comprising at least one processor and a memory configured to generate a panel-specific power headroom report (PHR) based on at least one panel-specific power management maximum power reduction (P-MPR) value specific to an antenna panel of the UE; and transmit the PHR to a network entity.

Clause 43: A computing device comprising one or more means for generating a panel-specific power headroom report (PHR) based on at least one panel-specific power management maximum power reduction (P-MPR) value specific to an antenna panel of the UE; and transmitting the PHR to a network entity.

Clause 44: A non-transitory computer-readable medium including instructions that when executed by a computing device, cause the computing device to perform the method of one or more of Clauses 1-24.

Clause 45: An apparatus for wireless communications by a network entity, comprising at least one processor and a memory configured to receive, from a user equipment (UE), a panel-specific power headroom report (PHR) generated based on at least one panel-specific power management maximum power reduction (P-MPR) value specific to an antenna panel of the UE; and schedule an uplink transmission from the UE based on the panel-specific PHR.

Clause 46: A computing device comprising one or more means for receiving, from a user equipment (UE), a panel-specific power headroom report (PHR) generated based on at least one panel-specific power management maximum power reduction (P-MPR) value specific to an antenna panel of the UE; and scheduling an uplink transmission from the UE based on the panel-specific PHR.

Clause 47: A non-transitory computer-readable medium including instructions that when executed by a computing device, cause the computing device to perform the method of one or more of Clauses 25-41.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmW), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM, etc.) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

Antennas 252, processors 266, 258, 264, and/or controller/processor 280 of UE 104 and/or antennas 234, processors 220, 230, 238, and/or controller/processor 240 of BS 102 may be used to perform the various techniques and methods described herein.

For example, as shown in FIG. 2, the controller/processor 280 of the UE 104 has a panel specifics reporting component 281 that may be configured to perform the operations shown in FIG. 6, as well as other operations described herein for receiving power control parameters for channels and/or reference signals sharing a same common TCI state. Although shown at the controller/processor, other components of UE 104 and BS 102 may be used to perform the operations described herein.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu\times}15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of generating and transmitting a panel-specific power headroom report (PHR) based on at least one panel-specific power management maximum power reduction (P-MPR) value specific to an antenna panel of a user equipment (UE). Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor).

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 6 and 7, as well as other operations described herein for reporting panel specific metrics.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated herein. Various modifications, changes and variations may be made in the arrangement, operation, and details of the methods and apparatus described herein.

What is claimed is:

1. A method for wireless communications by a user equipment (UE), comprising:

generating a panel-specific power headroom report (PHR) based on at least one panel-specific power management maximum power reduction (P-MPR) value specific to an antenna panel of the UE, wherein generating the PHR based on the panel-specific P-MPR comprises calculating a panel-specific maximum allowed UE output power ($P_{CMAX}$) for a virtual uplink transmission based on an actual panel-specific P-MPR for the antenna panel of the UE such that the panel-specific P-MPR is greater than zero; and transmitting the PHR to a network entity.

2. The method of claim 1, wherein the PHR is transmitted to indicate a different panel or a different beam for an uplink transmission.

3. The method of claim 1, wherein the virtual uplink transmission comprises a virtual physical uplink shared channel (PUSCH) or virtual sounding reference signal (SRS) transmission.

4. The method of claim 1, wherein the panel-specific PHR is generated based on the panel-specific P-MPR and at least one panel-specific configuration for the antenna panel.

5. The method of claim 4, wherein the at least one panel-specific configuration specifies at least one of:

a default associated pathloss reference signal (RS) in downlink, a default uplink power control adjustment state, or one or more default power control loop parameters.

6. The method of claim 4, wherein:

the at least one panel-specific configuration comprises multiple configurations; and the UE indicates, in the PHR, which of the multiple configurations was used for generating the panel-specific PHR.

7. The method of claim 1, wherein the UE indicates a panel ID for which the panel specific PHR was generated.

8. The method of claim 7, wherein the panel ID is indicated, via a sounding reference signal (SRS) resource set ID, a channel state information reference signal (CSI-RS) resource ID, a power control closed loop index, or a control resource set (CORESET) pool index.

9. The method of claim 1, wherein the PHR includes a dedicated bit for identifying a panel identifier (ID) specific to the antenna panel.

10. The method of claim 1, wherein content reported for different panels is positioned in the PHR in a defined order.

11. The method of claim 1, wherein, if the actual panel-specific PHR is reported, the panel-specific maximum allowed UE output power ($P_{CMAX}$) is also reported.

12. The method of claim 1, wherein the PHR includes at least one of the panel-specific P-MPR or an uplink reference signal received power (RSRP).

13. The method of claim 1, further comprising, indicating, in the PHR, at least one of a candidate panel or a beam reference signal (RS) identifier (ID).

14. The method of claim 13, further comprising selecting the candidate panel or beam RS ID based on one or more criteria.

15. The method of claim 14, wherein the criteria comprises at least one of a P-MPR or PHR value exceeding a threshold value.

16. The method of claim 1, further comprising adjusting transmission power of the network entity based on the panel-specific PHR.

17. The method of claim 1, wherein the PHR is transmitted via a medium access control (MAC) control element (CE) or uplink control information (UCI).

18. A method for wireless communications by a network entity, comprising:

receiving, from a user equipment (UE), a panel-specific power headroom report (PHR) generated based on at least one panel-specific power management maximum power reduction (P-MPR) value specific to an antenna panel of the UE, wherein generating the PHR based on the panel-specific P-MPR comprises calculating a panel-specific maximum allowed UE output power ($P_{CMAX}$) for a virtual uplink transmission based on an actual panel-specific P-MPR for the antenna panel of the UE such that the panel-specific P-MPR is greater than zero; and scheduling an uplink transmission from the UE based on the panel-specific PHR.

19. The method of claim 18, wherein:

the PHR indicates a different panel or a different beam for an uplink transmission; and the scheduling involves the different panel or the different beam.

20. The method of claim 18, further comprising signaling, to the UE, at least one panel-specific configuration, wherein the panel-specific PHR is generated based on the panel-specific P-MPR and the at least one panel-specific PHR configuration for the antenna panel.

21. The method of claim 20, wherein:

the at least one panel-specific configuration comprises multiple configurations; and the UE indicates, in the PHR, which of the multiple configurations was used for generating the panel-specific PHR.

22. The method of claim 18, wherein the UE indicates a panel ID for which the panel specific PHR was generated.

23. The method of claim 22, wherein the panel ID is indicated, via a sounding reference signal (SRS) resource set ID, a channel state information reference signal (CSI-RS) resource ID, a power control closed loop index, or a control resource set (CORESET) pool index.

24. The method of claim 18, wherein the PHR includes a dedicated bit for identifying a panel identifier (ID) specific to the antenna panel.

25. The method of claim 18, wherein content reported for different panels is positioned in the PHR in a defined order.

26. The method of claim 18, wherein, if the actual panel-specific PHR is reported, the panel-specific maximum allowed UE output power ($P_{CMAX}$) is also reported.

27. The method of claim 18, wherein the PHR includes at least one of the panel-specific P-MPR or an uplink reference signal received power (RSRP).

28. The method of claim 18, wherein the PHR at least one of a candidate panel or a beam reference signal (RS) identifier (ID).

29. The method of claim 18, further comprising adjusting transmission power based on the panel-specific PHR.

30. An apparatus for wireless communications by a user equipment (UE), comprising:

at least one processor, coupled to and at least one memory, and configured to;

generate a panel-specific power headroom report (PHR) based on at least one panel-specific power management maximum power reduction (P-MPR) value specific to an antenna panel of the UE, wherein generating the PHR based on the panel-specific P-MPR comprises calculating a panel-specific maximum allowed UE output power ($P_{CMAX}$) for a virtual uplink transmission based on an actual panel-specific P-MPR for the antenna panel of the UE such that the panel-specific P-MPR is greater than zero; and transmit the PHR to a network entity.

31. An apparatus for wireless communications by a network entity, comprising:

at least one processor, coupled to and at least one memory, and configured to:

receive, from a user equipment (UE), a panel-specific power headroom report (PHR) generated based on at least one panel-specific power management maximum power reduction (P-MPR) value specific to an antenna panel of the UE, wherein generating the PHR based on the panel-specific P-MPR comprises calculating a panel-specific maximum allowed UE output power ($P_{CMAX}$) for a virtual uplink transmission based on an actual panel-specific P-MPR for the antenna panel of the UE such that the panel-specific P-MPR is greater than zero; and schedule an uplink transmission from the UE based on the panel-specific PHR.

* * * * *